(12) United States Patent
Wolf et al.

(10) Patent No.: US 11,981,051 B2
(45) Date of Patent: May 14, 2024

(54) EXTRUDED PART, BATTERY HOUSING HAVING AN EXTRUDED PART, METHOD FOR PRODUCING AN EXTRUDED PART, EXTRUSION TOOL

(71) Applicants: Kautex Textron Gmbh & Co. KG, Bonn (DE); Weber Fibertech GmbH, Markdorf (DE)

(72) Inventors: Hartmut Wolf, Königswinter (DE); Norbert Stötzner, Markdorf (DE)

(73) Assignees: Kautex Textron GmbH & Co. KG, Bonn (DE); Weber Fibertech GmbH, Markdorf (DE)

( * ) Notice: Subject to any disclaimer, the term of this patent is extended or adjusted under 35 U.S.C. 154(b) by 0 days.

(21) Appl. No.: 18/019,644

(22) PCT Filed: Aug. 2, 2021

(86) PCT No.: PCT/EP2021/071591
§ 371 (c)(1),
(2) Date: Feb. 3, 2023

(87) PCT Pub. No.: WO2022/033914
PCT Pub. Date: Feb. 17, 2022

(65) Prior Publication Data
US 2023/0241812 A1    Aug. 3, 2023

(30) Foreign Application Priority Data

Aug. 11, 2020   (DE) ............... 10 2020 121 141.4

(51) Int. Cl.
*B29C 33/00* (2006.01)
*B29C 43/18* (2006.01)
(Continued)

(52) U.S. Cl.
CPC .......... *B29C 33/0033* (2013.01); *B29C 43/18* (2013.01); *B29C 43/361* (2013.01);
(Continued)

(58) Field of Classification Search
CPC ............... B29C 33/0033; B29C 43/18; B29C 2043/182; B29C 48/154; B32B 5/028;
(Continued)

(56) References Cited

U.S. PATENT DOCUMENTS 2,239,248 A     4/1941   Rieser
11,141,893 B2 * 10/2021  Suzuki ............... B32B 5/28
(Continued)

FOREIGN PATENT DOCUMENTS

CN   105773895 A    7/2016
DE     3420132 A1  12/1984
(Continued)

OTHER PUBLICATIONS

English translation of JP2004082470A (Year: 2004).*
International Preliminary Report on Patentability in PCT/EP2021/071591, issued Jul. 8, 2022 (24 pages).

*Primary Examiner* — Jasper Saberi
(74) *Attorney, Agent, or Firm* — Occhiuti & Rohlicek LLP (57) ABSTRACT

An extruded part is formed by extrusion of at least one polymer melt, wherein the polymer melt or polymer melts has/have two melt fronts, which form two material inner edges of the extruded part when the polymer melt or polymer melts is/are in the solidified state; —the two material inner edges are integrally bonded to each other and define a linear binding seam of the extruded part. The binding seam is situated in a connection region of the extruded part; and—the extruded part has at least one fiber grid, which is situated in the connection region of the
(Continued)

extruded part and is connected to the extruded part such that the fiber grid bridges the two material inner edges. The extruded part may be a part of a battery housing for a traction battery.

12 Claims, 3 Drawing Sheets

(51) Int. Cl.
*B29C 43/36* (2006.01)
*B29C 43/40* (2006.01)
*B29C 48/154* (2019.01)
*B32B 5/02* (2006.01)
*B32B 27/12* (2006.01)
*H01M 50/202* (2021.01)
*H01M 50/249* (2021.01)
*B29K 105/08* (2006.01)
*B29L 31/34* (2006.01)

(52) U.S. Cl.
CPC ............ *B29C 43/40* (2013.01); *B29C 48/154* (2019.02); *B32B 5/028* (2013.01); *B32B 27/12* (2013.01); *H01M 50/202* (2021.01); *H01M 50/249* (2021.01); *B29C 2043/182* (2013.01); *B29C 2043/3602* (2013.01); *B29C 2043/3615* (2013.01); *B29K 2105/0809* (2013.01); *B29K 2105/0881* (2013.01); *B29K 2105/089* (2013.01); *B29L 2031/3468* (2013.01); *B32B 2260/021* (2013.01); *B32B 2260/046* (2013.01); *H01M 2220/20* (2013.01)

(58) Field of Classification Search
CPC ...... B29K 2105/0809; B29K 2105/089; B29K 2105/0881; B29L 2031/3468; H01M 50/249; H01M 50/202; B60L 50/64; B60K 1/04
See application file for complete search history.

(56) References Cited

U.S. PATENT DOCUMENTS

| | | | |
|---|---|---|---|
| 11,794,385 | B2 * | 10/2023 | Suzuki .................... B29C 70/12 |
| 2020/0198193 | A1 | 6/2020 | Suzuki et al. |
| 2020/0198194 | A1 * | 6/2020 | Suzuki .................... B32B 5/28 |
| 2022/0145046 | A1 * | 5/2022 | Cremer .................. C08L 77/02 |

FOREIGN PATENT DOCUMENTS

| | | | |
|---|---|---|---|
| DE | 102006048291 A1 | | 2/2008 |
| DE | 102015008053 A1 | | 12/2016 |
| DE | 102016207545 A1 | | 11/2017 |
| DE | 202018103994 U1 | | 8/2018 |
| EP | 2060380 A1 | | 5/2009 |
| JP | 2000167863 A | | 6/2000 |
| JP | 2004082470 A | * | 3/2004 |
| WO | 9422651 A1 | | 10/1994 |
| WO | 2019044693 A1 | | 3/2019 |

* cited by examiner

EXTRUDED PART, BATTERY HOUSING HAVING AN EXTRUDED PART, METHOD FOR PRODUCING AN EXTRUDED PART, EXTRUSION TOOL

This application is a 371 national stage application of International Application No. PCT/EP2021/071591, filed Aug. 2, 2021, which claims the benefit of the filing date of German Application No. 10 2020 121 141.4, filed Aug. 11, 2020, the contents of which are hereby incorporated by reference in their entireties.

The present invention relates to an extruded part and to a battery housing having an extruded part for a traction battery of a motor vehicle. Furthermore, the present invention relates to a method for producing an extruded part by means of an extrusion tool Finally, the present invention relates to an extrusion tool for producing an extruded part.

Extruded parts, such as battery housing shells made of plastics material, which have openings in the form of through-holes, can certainly be produced with conventional extrusion tools off-tool (i.e. without production steps downstream of the extrusion), but correspondingly produced extruded parts have reduced stability in the region of the through-openings. The reason for this is that, during the production process by means of extrusion, when there is a flow around a core of the extrusion tool, a melt front of a polymer melt is deformed on the core such that, in the flow direction of the polymer melt (or the melt front of the polymer melt), facing away from the core, two melt fronts (formed by one melt front of the polymer melt flowing around the core) meet and are welded to each other. In the process, a linear binding seam which is defined by the two interconnected melt fronts is weakened. This is because the two melt fronts have already partially cooled by the time they meet, so that the connection strength of the binding seam is reduced.

In the case of extruded parts that are produced by extrusion of a polymer melt containing fiber material (e.g. glass fibers or carbon fibers), there is the additional problem that during extrusion of the polymer melt, in the region of the melt fronts, the fibers are largely aligned such that the longitudinal extensions of the fibers are oriented parallel to the melt fronts and thus also parallel to the binding seam of the extruded part. Consequently, the fibers do not contribute to stabilizing the extruded part in the region of the through-openings thereof. In particular, the fibers do not contribute to stabilizing the binding seam of the extruded part.

Consequently, in the production methods known from the prior art, the through-openings in extruded parts are introduced into the extruded part after the extrusion process. The through-openings can be introduced into the extruded part by punching, drilling, or machining. The corresponding production of the extruded part is consequently complex and thus cost-intensive. Furthermore, when the through-openings are made, the component to be produced is exposed to significant contamination, which can only be completely removed from the component to be produced with great effort.

Large-area extruded parts have to be formed from a plurality of polymer melts, since the melt fronts only retain their melt-plastic character over a limited deformation path during the extrusion process. Along a contact line of melt fronts of the respective polymer melts—i.e. along a binding seam of the extruded part to be produced—the extruded parts formed in this way have reduced stability. This is because the binding seam of the extruded part is also weakened for extruded parts formed from a plurality of polymer melts for the reasons described above.

The object of the present invention is to provide an extruded part with increased stability.

This object of the present invention is achieved by an extruded part having the features of claim 1. Advantageous embodiments of the extruded part are described in the claims dependent on claim 1.

More specifically, the object of the present invention is achieved by an extruded part for a traction battery, wherein the extruded part is formed by extrusion of at least one polymer melt, wherein the polymer melt(s) has/have two melt fronts, which form two material inner edges of the extruded part when the polymer melt(s) is/are in the solidified state. The two material inner edges are integrally bonded to each other and define a linear binding seam of the extruded part, wherein the binding seam is situated in a connection region of the extruded part. The extruded part according to the invention has at least one fiber grid, which is situated in the connection region of the extruded part and is connected to the extruded part such that the fiber grid bridges the two material inner edges.

The extruded part is preferably designed as a battery housing shell for a battery housing of a traction battery for a motor vehicle.

The extruded part according to the invention has increased stability, in particular in the connection region thereof. This is because the two material inner edges of the extruded part are bridged by the provision of the fiber grid in the connection region of the extruded part. Targeted placement of the fiber grid in the extrusion tool can influence the orientation of the fibers of the fiber grid in the extrusion tool in a targeted manner, so that fibers of the extruded part bridge the two material inner edges. For this purpose, the fibers of the fiber grid have longitudinal extensions which are at least partially oriented perpendicularly to the binding seam of the extruded part.

Thus, the stability of extruded parts that have through-openings is increased in the region of the through-openings. The stability of extruded parts made from at least two polymer melts is also increased.

The fiber grid is a separate component that is connected to the polymer melt during the production process of the extruded part, with the connection being a form-fit connection and/or an integral bond. The fiber grid can also be referred to as a fiber grid mat or a fiber grid insert.

The connection region of the extruded part is the region of the extruded part adjacent to the material inner edges. Furthermore, both an inner surface and an outer surface of the extruded part, which are respectively adjacent to the material inner edges that are integrally bonded to each other, belong to the connection region of the extruded part.

The linear binding seam can have straight portions and curved portions.

The fibers of the fiber grid are preferably designed in the form of glass fibers and/or carbon fibers.

The polymer melt(s) preferably have polyamide and/or polypropylene and/or polycarbonate and/or polyethylene, or a mixture of these plastics materials. More preferably, the polymer melt(s) consist of polyamide and/or polypropylene and/or polycarbonate and/or polyethylene, or a mixture of these plastics materials.

The polymer melt(s) preferably have a fiber material that is contained in a matrix material (polyamide and/or polypropylene and/or polycarbonate and/or polyethylene, or a mixture of these plastics materials). The fiber material of the polymer melt(s) preferably has glass fibers and/or carbon fibers.

For example, the extruded part is formed by extrusion of a polymer melt, wherein the polymer melt has two melt fronts, which form two material inner edges of the extruded part when the polymer melt is in the solidified state, wherein the two melt fronts are formed by a flow around a tool core. The two material inner edges are integrally bonded to each other and define a linear binding seam of the extruded part, wherein the binding seam is situated in a connection region of the extruded part. The extruded part has at least one fiber grid, which is situated in the connection region of the extruded part and is connected to the extruded part such that the fiber grid bridges the two material inner edges.

Furthermore, for example, the extruded part is formed by extrusion of two polymer melts, wherein a first polymer melt has a first melt front and a second polymer melt has a second melt front, which form two material inner edges of the extruded part in the solidified state of the polymer melts. The two material inner edges are integrally bonded to each other and define a linear binding seam of the extruded part, wherein the binding seam is situated in a connection region of the extruded part. The extruded part has at least one fiber grid, which is situated in the connection region of the extruded part and is connected to the extruded part such that the fiber grid bridges the two material inner edges.

The integral bond of the at least two material inner edges is preferably realized by welding the at least two material inner edges.

The extruded part is preferably designed such that at least 50% of the fibers of the fiber grid have a longitudinal extension which runs transversely to the binding seam and encloses an angle of between 45° and 90° with the binding seam.

The stability of the extruded part is further increased by a corresponding design of the extruded part.

For the purposes of the present invention, an angle of 90° enclosed by the binding seam and a longitudinal extension of a fiber is to be understood as meaning that the longitudinal extension of the fiber runs perpendicularly to the binding seam of the extruded part.

Preferably, between 50% and 90% of the fibers of the fiber grid have a longitudinal extension that encloses an angle of between 45° and 90° with the binding seam. With a correspondingly designed fiber grid, good stabilization of the extruded part could be achieved in the connection region.

More preferably, between 50% and 90% of the fibers of the fiber grid have a longitudinal extension that encloses an angle of between 60° and 90° with the binding seam. With a correspondingly designed fiber grid, it was possible to achieve even better stabilization of the extruded part in the connection region.

Even more preferably, between 70% and 90% of the fibers of the fiber grid have a longitudinal extension that encloses an angle of between 60° and 90° with the binding seam. With a correspondingly designed fiber grid, it was possible to achieve even better stabilization of the extruded part in the connection region.

Even more preferably, between 70% and 90% of the fibers of the fiber grid have a longitudinal extension that encloses an angle of between 75° and 90° with the binding seam. With a correspondingly designed fiber grid, it was possible to achieve even better stabilization of the extruded part in the connection region.

Even more preferably, between 70% and 90% of the fibers of the fiber grid have a longitudinal extension that encloses an angle between 85° and 90° with the binding seam. With a correspondingly designed fiber grid, it was possible to achieve even better stabilization of the extruded part in the connection region.

Even more preferably, 80% of the fibers of the fiber grid have a longitudinal extension which encloses an angle of substantially 90° with the binding seam. With a correspondingly designed fiber grid, it was possible to achieve even better stabilization of the extruded part in the connection region.

The extruded part is preferably designed such that the at least one fiber grid adjoins an inner surface of the extruded part.

The correspondingly designed extruded part has increased bending stability. In particular in the case of an extruded part designed as a housing shell, the correspondingly designed housing shell has increased stability when the housing shell bends as a result of internal overpressure.

The feature according to which the fiber grid adjoins an inner surface of the extruded part is to be understood such that the fiber grid is encapsulated and/or penetrated by the material of the extruded part, wherein an outer surface of the fiber grid coincides with the inner surface of the extruded part or is situated opposite thereto.

The extruded part is preferably designed such that the at least one fiber grid adjoins an outer surface of the extruded part.

The correspondingly designed extruded part has increased bending stability. In particular in the case of an extruded part designed as a housing shell, the correspondingly designed housing shell has increased stability when the housing shell bends as a result of internal negative pressure.

The feature according to which the fiber grid adjoins an outer surface of the extruded part is to be understood such that the fiber grid is encapsulated and/or penetrated by the material of the extruded part, wherein an outer surface of the fiber grid coincides with the outer surface of the extruded part or is situated opposite thereto.

The extruded part is preferably designed such that the fiber grid is embedded in a matrix material, wherein the matrix material is integrally bonded to the polymer melt(s).

The correspondingly designed extruded part has even greater stability. This is because by embedding the fiber material in the matrix material, the forces can be better transferred from the extruded part to the fibers thereof in the component, which is also referred to as an organic sheet. With the correspondingly designed extruded part, better penetration of the fiber grid with plastics material is achieved, so that the stability of the extruded part is increased.

The matrix material preferably has polyamide and/or polypropylene and/or polycarbonate and/or polyethylene, or a mixture of these plastics materials. More preferably, the matrix material consists of polyamide and/or polypropylene and/or polycarbonate and/or polyethylene, or a mixture of these plastics materials.

A further object of the present invention is the provision of a battery housing which has increased stability and reduced production costs.

This object of the present invention is achieved by a battery housing having the features of claim 6. More precisely, this object of the present invention is achieved by a battery housing for a traction battery, wherein the battery housing has at least one extruded part as described above in this description.

The extruded part is preferably designed as a battery housing shell, which in turn is designed as a battery housing upper shell or as a battery housing lower shell. Even more preferably, the battery housing has a first extruded part designed as a battery housing upper shell and a second extruded part designed as a battery housing lower shell.

Another object of the present invention is to provide a traction battery that has increased stability and reduced production costs.

The object of the present invention is achieved by a traction battery having the features of claim 7. More precisely, this object of the present invention is achieved by a traction battery for a motor vehicle, wherein the traction battery has a battery housing as described above in this description, wherein at least one battery module is contained in the interior of the battery housing.

A further object of the present invention is the provision of a method for producing an extruded part by means of an extrusion tool, wherein the method allows for a more cost-effective production of an extruded part with increased stability.

This object of the present object is achieved by a method for producing an extruded part having the features of claim 8. Advantageous embodiments are described in the claims dependent on claim 8.

More precisely, this object of the present invention is achieved by a method for producing an extruded part by means of an extrusion tool, wherein the method has the following method steps:
- placing at least one polymer melt in a die of the extrusion tool that is in the open position;
- placing a fiber grid in the extrusion tool;
- closing the extrusion tool so that a punch of the extrusion tool comes into contact with the at least one polymer melt and the polymer melt is deformed by applying pressure by means of the punch and the fiber grid is surrounded on two sides by two melt fronts of the at least one polymer melt and is bonded to the polymer melt.

The method according to the invention has the advantage that an extruded part can be produced with increased stability, in particular in the connection region thereof, with the production costs being significantly reduced due to the off-tool production of the extruded part. This is because the two material inner edges of the extruded part are bridged by the provision of the fiber grid in the connection region of the extruded part. Targeted placement of the fiber grid in the extrusion tool can influence the orientation of the fibers of the fiber grid in the extrusion tool in a targeted manner, so that fibers of the extruded part bridge the two material inner edges. For this purpose, the fibers of the fiber grid have longitudinal extensions which are at least partially oriented perpendicularly to the binding seam of the extruded part.

Thus, the stability of extruded parts that have through-openings is increased in the region of the through-openings. The stability of extruded parts made from at least two polymer melts is also increased.

The extruded part is preferably designed as a battery housing shell, which in turn is designed as a battery housing upper shell or as a battery housing lower shell.

The fiber grid is preferably placed in the extrusion tool in a manner oriented such that at least 50% of the fibers of the fiber grid have a longitudinal extension that runs transversely to a binding seam to be produced in the extruded part and encloses an angle of between 45° and 90° with the binding seam.

The fiber grid is preferably placed in the extrusion tool in a manner oriented such that between 50% and 90% of the fibers of the fiber grid have a longitudinal extension that encloses an angle of between 45° and 90° with the binding seam to be produced in the extruded part.

The fiber grid is preferably placed in the extrusion tool in a manner oriented such that between 50% and 90% of the fibers of the fiber grid have a longitudinal extension that encloses an angle of between 60° and 90° with the binding seam to be produced in the extruded part.

Even more preferably, the fiber grid is placed in the extrusion tool in a manner oriented such that between 70% and 90% of the fibers of the fiber grid have a longitudinal extension that encloses an angle of between 60° and 90° with the binding seam to be produced in the extruded part.

Even more preferably, the fiber grid is placed in the extrusion tool in a manner oriented such that between 70% and 90% of the fibers of the fiber grid have a longitudinal extension that encloses an angle of between 75° and 90° with the binding seam to be produced in the extruded part.

Even more preferably, the fiber grid is placed in the extrusion tool in a manner oriented such that between 70% and 90% of the fibers of the fiber grid have a longitudinal extension that encloses an angle of between 85° and 90° with the binding seam to be produced in the extruded part.

Even more preferably, the fiber grid is placed in the extrusion tool in a manner oriented such that 80% of the fibers of the fiber grid have a longitudinal extension that encloses an angle of substantially 90° with the binding seam to be produced in the extruded part.

The method is preferably designed such that the fiber grid is placed in the extrusion tool such that the fiber grid is situated in the immediate vicinity of a core of the die, so that the core is situated between the polymer melt and the fiber grid.

The correspondingly designed method ensures that the extruded component having at least one through-opening has increased stability, in particular in the region of the through-opening. This is because the fiber grid results in stabilization of the extruded component in the region of the binding seam to be produced, which adjoins the through-opening.

The feature according to which the core is situated between the polymer melt and the fiber grid means that the fiber grid is situated downstream of the core with respect to a flow direction of the polymer melt(s) or the melt fronts of the polymer melt(s).

The fiber grid is preferably positioned on an inner surface of the extruded component by means of the method. More preferably, the fiber grid is positioned on an outer surface of the extruded component by means of the method. Even more preferably, a fiber grid is positioned on an outer surface of the extruded component and a further fiber grid is positioned on an inner surface of the extruded component by means of the method.

More preferably, the method is designed such that at least two polymer melts are placed in the die of the extrusion tool that is in the open position and a fiber grid is placed between the two polymer melts. The extrusion tool is then closed so that the punch of the extrusion tool comes into contact with the two polymer melts and the polymer melts are deformed by applying pressure by means of the punch and the fiber grid is surrounded by a first melt front of the first polymer melt and by a second melt front of the second polymer melts and is bonded to the polymer melts.

With the correspondingly designed method, large-area extruded parts can be produced, for the production of which more than one polymer melt is necessary, with these large-area extruded parts also having increased stability, in particular in the region of the binding seams of the extruded part.

A further object of the present invention is the provision of an extrusion tool for producing an extruded part, the extrusion tool allowing for a more cost-effective production of an extruded part with increased stability.

This object of the present object is achieved by an extrusion tool for producing an extruded part having the features of claim 11. Advantageous embodiments are described in the claims dependent on claim 11.

More precisely, this object of the present invention is achieved by an extrusion tool for producing an extruded part for a traction battery and/or for a housing of a traction battery, wherein the extrusion tool has a die and a punch, wherein the die of the extrusion tool has a receiving device for receiving a fiber grid.

The extrusion tool according to the invention has the advantage that an extruded part can be produced with increased stability, in particular in the connection region thereof, with the production costs being significantly reduced due to the off-tool production of the extruded part.

This is because two material inner edges of the extruded part are bridged by the provision of the fiber grid in the connection region of the extruded part. Targeted placement of the fiber grid in the extrusion tool can influence the orientation of the fibers of the fiber grid in the extrusion tool in a targeted manner, so that fibers of the extruded part bridge the two material inner edges. For this purpose, the fibers of the fiber grid have longitudinal extensions which are at least partially oriented perpendicularly to the binding seam of the extruded part.

Thus, the stability of extruded parts that have through-openings is increased in the region of the through-openings. The stability of extruded parts made from at least two polymer melts is also increased.

The extruded part is preferably designed as a battery housing shell, which in turn is designed as a battery housing upper shell or as a battery housing lower shell.

The extrusion tool is preferably designed such that the receiving device is designed as a recess in the die.

The correspondingly designed extrusion tool allows a particularly simple fixing or positioning of the fiber grid in the extrusion tool, without the need for additional holding devices for holding the fiber grid.

More preferably, the extrusion tool is designed such that it has a tool part which can be adjusted between a first position and a second position in a pressing direction of the punch. Furthermore, the extrusion tool has a core which can be adjusted between a first position and a second position in an extension direction running transversely to the pressing direction. The tool part has a receiving opening for receiving the core, wherein the core, in the second position thereof, can only be inserted into the receiving opening of the tool part when the tool part is in the second position thereof.

The correspondingly designed extrusion tool allows for the production of geometrically complex extruded parts, for example battery housing shells, which have through-openings at any desired position. For example, if there are a plurality of wall portions of the extruded part situated at an angle to each other, the through-opening(s) can be introduced in any of the wall portions, so that complex extruded parts having through-openings situated in any way can be produced off-tool.

Further advantages, details, and features of the invention can be found below in the described embodiments. In the drawings, in detail.

In the following description, the same reference signs denote the same components or features, so that a description of a component with reference to one drawing also applies to the other drawings, thus avoiding repeating the description. Furthermore, individual features that have been described in connection with one embodiment can also be used separately in other embodiments.

Figure 1A:
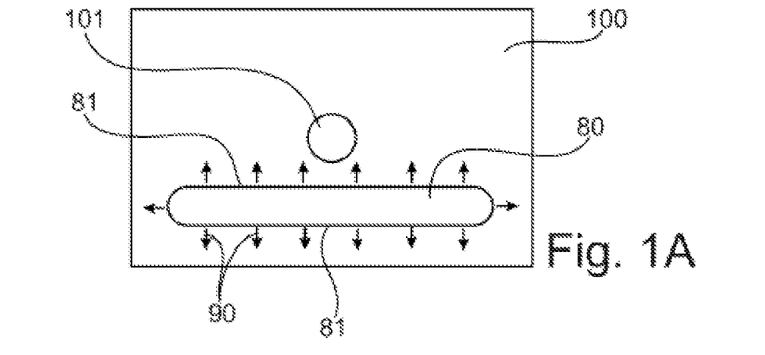
FIG. 1A: shows a plan view of a die having a core of an extrusion tool with an inserted polymer melt at the beginning of a production process of an extruded part, wherein a punch of the extrusion tool and a fiber grid of the extruded part are not shown.
Figure 5:
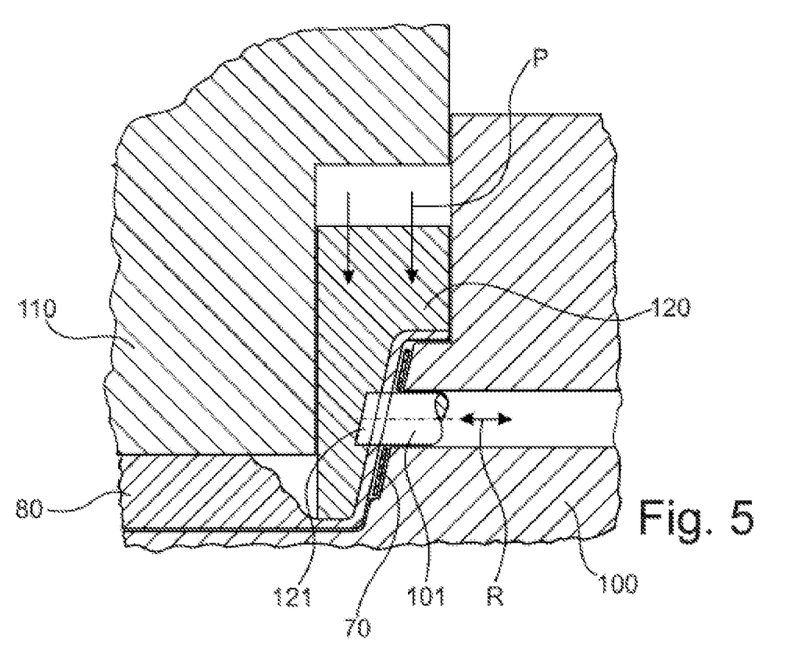
FIG. 5: shows a sectional view of an extrusion tool according to another embodiment of the present invention.

FIG. 1A shows a plan view of a die 100, having a core 101, of an extrusion tool, wherein the extrusion tool is shown in cross-section in FIG. 5. As can be seen from FIG. 1A, a polymer melt 80 is inserted into the die 101 and can be deformed by applying pressure by means of a punch 110 of the extrusion tool. By applying pressure to the polymer melt 80 by means of the punch 110, the polymer melt 80 is extruded, so that melt fronts 81 of the polymer melt 80 propagate along the flow directions shown by the arrows 90. The core 101 protrudes from a surface of the die 100 so that a melt front 81 of the polymer melt 80 has to flow around the core 101.

Figure 1B:
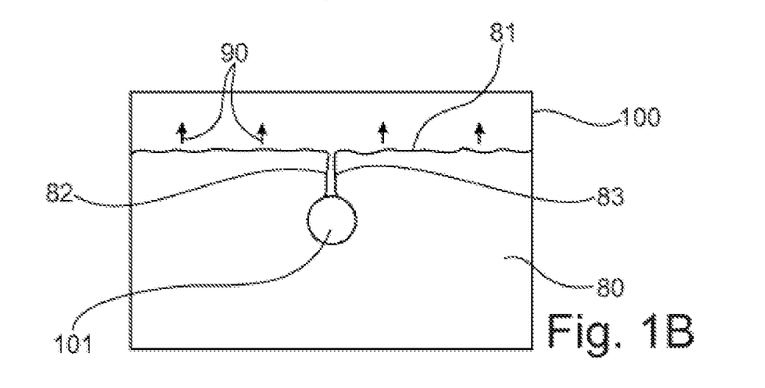
FIG. 1B: shows the extrusion tool shown in FIG. 1A at a later point in time in the production process, in which the core is already closed by the polymer melt.

FIG. 1B shows the extrusion tool shown in FIG. 1A at a later point in time in the production process of the extruded part 10, at which the polymer melt 80 is further deformed and the polymer melt 80 has already encapsulated the core 101. Due to the polymer melt 80 flowing around the core 101, two melt fronts 82, 83 are formed downstream of the flow direction of the melt front behind the core 101, which come into contact with each other in the further course of the production process of the extruded part 10 and are thus welded.

Figure 1C:
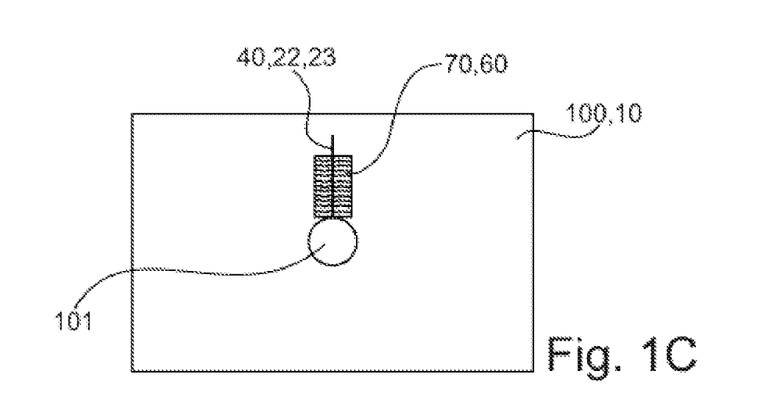
FIG. 1C: shows the extrusion tool shown in FIGS. 1A and 1B at the end of the production process in which the extruded part is completed, with FIG. 1C showing a fiber grid in a connection region of the extruded part.

FIG. 1C shows this state in which the extrusion process is completed. It can be seen that the two melt fronts 82, 83 are welded to each other and each form material inner edges 22, 23 of the extruded part 10. The material inner edges 22, 23 are welded to each other and form a linear binding seam 40. It can be seen from FIG. 1C that a fiber grid 70 is situated in a connection region 60 of the extruded part 10, wherein fibers of the fiber grid 70 bridge the material inner edges 22, 23. This means that the respective fibers of the fiber grid 70 extend transversely to the direction of extension of the binding seam 40.

Consequently, an extruded part 10 with increased stability is produced by the method for producing an extruded part 10 by means of an extrusion tool. The method includes a method step of placing at least one polymer melt 80 in the die 100 of the extrusion tool that is in an open position. A fiber grid 70 is also placed in the extrusion tool. By closing the extrusion tool so that the punch 110 of the extrusion tool comes into contact with the polymer melt 80, the polymer melt 80 is deformed by applying pressure by means of the punch 110, so that the fiber grid 70 is surrounded on two sides by the two melt fronts 82, 83 of the polymer melt 80 and is bonded to the polymer melt 80.

This production process produces an extruded part 10 by deforming at least one polymer melt 80. In the solidified state of the polymer melt 80, two melt fronts 82, 83 of the polymer melt 80 form the two material inner edges 22, 23 of the extruded part 10. The material inner edges 22, 23 are integrally bonded to each other by being welded to each other, and the material inner edges 22, 23 define the linear binding seam 40 of the extruded part 10. The binding seam 40 is situated in a connection region 60 of the extruded part 10, the connection region 60 encompassing the immediate vicinity of the material inner edges 22, 23. The extruded part 10 has the fiber grid 70, with it also being possible for the extruded part 10 to have a multiplicity of fiber grids 70. The fiber grid 70 is situated in the connection region 60 of the extruded part 10 and is connected to the extruded part such that the fiber grid 70 bridges the two material inner edges 22, 23. However, the fiber grid 70 could also extend over the entire surface of the extruded part 10. In this case, individual fibers of the fiber grid 70 run transversely to the direction of extension of the binding seam 40, so that the individual fibers of the fiber grid 70 bridge the two material inner edges 22, 23.

The extruded part 10 is preferably designed as a battery housing shell 10. The fiber grid 70 can preferably adjoin an inner surface of the extruded part 10. Furthermore, it is possible for the fiber grid 70 to adjoin an outer surface of the extruded part 10. To further increase the stability of the extruded part 10, two fiber grids 70 can also be provided, which are situated on two sides of the extruded part 10, wherein one fiber grid adjoins an inner surface of the extruded part 10, and another fiber grid 70 adjoins an outer surface of the extruded part 10.

The fiber grid 70 can be designed in such a way that the fiber material is embedded in a material matrix, wherein the matrix material is integrally bonded to the polymer melt 80 or polymer melts 80.

Figure 2A:
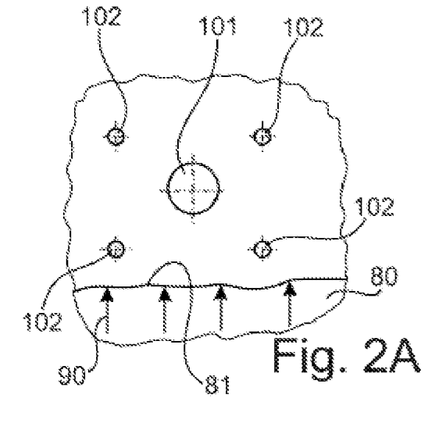
FIG. 2A: shows a plan view of a die of an extrusion tool having a plurality of cores during a production process of an extruded part with a polymer melt in the deforming process, wherein a fiber grid of the extruded part and a punch of the extrusion tool are not shown.
Figure 2B:
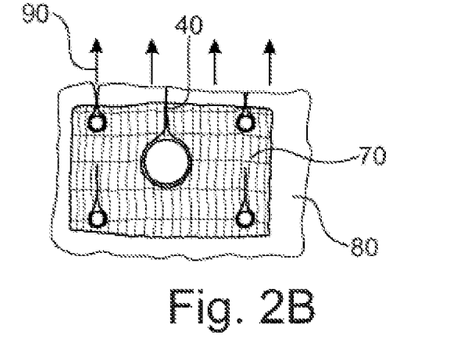
FIG. 2B: shows the extrusion tool shown in FIG. 2A at a later point in time in the production process of the extruded part, the fiber grid of the extruded part being shown by way of deviation from FIG. 2A.

FIGS. 2A and 2B schematically show the production process of a further extruded part 10. FIG. 2A shows a plan view of a die 100 of an extrusion tool having a plurality of cores 101, 102 during a production process of an extruded part 10 with a polymer melt 80 in the deforming process. Neither a fiber grid 70 of the extruded part 10 nor a punch 110 of the extrusion tool is shown in FIG. 2A. However, these are shown in FIG. 5.

It can be seen that the extrusion tool has five cores 101, 102. A first core 101 has a larger diameter than the four other cores 102. FIG. 2A shows the extrusion tool at an earlier point in time in the extrusion process than in FIG. 2B. It can be seen that in the state of FIG. 2A the melt front 81 of the polymer melt 80 is still at a distance from the cores 101, 102. As the extrusion process progresses, the polymer melt 80 encloses the cores 101, 102, so that melt fronts 82, 83 of the polymer melt 80 interconnect downstream of the respective cores 101, 102 and form material inner edges 22, 23 of the extruded part 10. It can be seen from FIG. 2B that the fiber grid 70 is dimensioned such that the fiber grid 70 covers the entire region of the extruded part 10 in which through-holes 14 are to be formed in the extruded part 10.

Figure 3A:
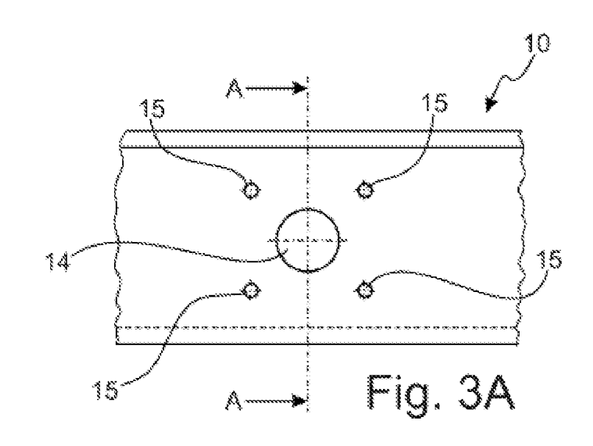
FIG. 3A: shows a plan view of an extruded part according to the invention with a plurality of through-openings, wherein the fiber grid of the extruded part is not shown.
Figure 3B:
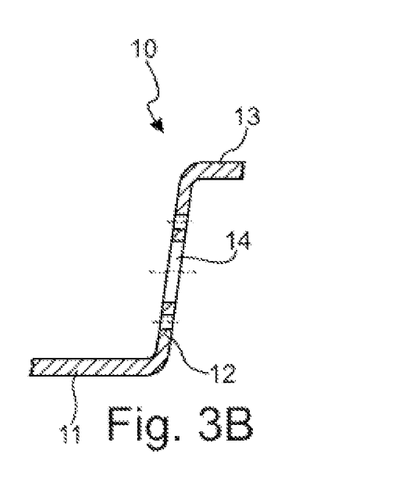
FIG. 3B: shows a sectional view of the extruded part shown in FIG. 3A along the section plane A-A shown in FIG. 3A.

FIGS. 3A and 3B show the extruded part 10 produced in this way, with the extruded part being shown in a plan view in FIG. 3A, and with the extruded part 10 shown in FIG. 3A being shown along the section A-A in FIG. 3B. The extruded part 10 has three wall portions, namely a first wall portion 11, a second wall portion 12, and a third wall portion 13. The wall portions 11, 12, 13 are situated at an angle to each other. It can be seen that a through-hole 14 formed by flowing around the core 101 is formed in the second wall portion 12. The other holes, which are produced by the polymer melt 80 flowing around the cores 102, cannot be seen in FIG. 3B.

Figure 4A:
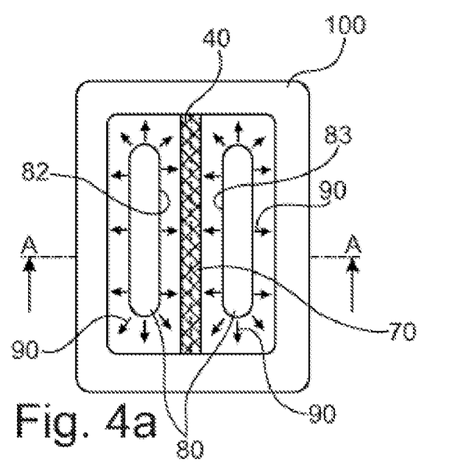
FIG. 4A: shows a plan view of an extrusion tool for producing an extruded part made from at least two polymer melts.
Figure 4B:
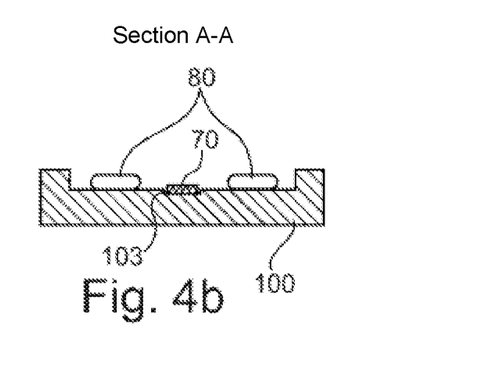
FIG. 4B: shows a sectional view of the extrusion tool shown in FIG. 4A.

FIGS. 4A and 4B show another extrusion tool for producing an extruded part 10. FIG. 4A is a plan view of the extrusion tool, and FIG. 4B is a sectional view of the extrusion tool shown in FIG. 4A along the section plane A-A. It can be seen that two polymer melts 80 are inserted into the die 100 of the extrusion tool. A fiber grid 70 is situated between the two polymer melts 80 so that a first melt front 82 and a second melt front 83 come into contact with each other in the region of the fiber grid 70 as a result of deformation of the two polymer melts 80. The integrally bonded melt fronts 82, 83 then form material inner edges 22, 23 of the finished extruded part 10, which in turn form the binding seam 40 of the extruded part.

FIG. 4B shows that the die 100 has a receiving device 103 in the form of a recess 103 into which the fiber grid 70 is inserted. The fiber grid 70 thus remains stationary in the die 100 during the production process of the extruded part 10.

FIG. 5 shows a sectional view of an extrusion tool. As already stated above, the extrusion tool has a die 100 and a punch 110. The polymer melt 80 situated between the die 100 and the punch 110 is deformed in a pressing direction P by pressing the punch 110 down. It can be seen from FIG. 5 that the extrusion tool has a tool part 120 which can be adjusted between a first position and a second position in the pressing direction P of the punch 110. It can also be seen that a movable core 101 is situated in the die 101 and can be adjusted between a first position and a second position in an extension direction R running transversely to the pressing direction P. In the extrusion tool shown in FIG. 5, the core 101 is in the second position thereof and the tool part 120 is in the second position thereof. The tool part 120 has a receiving opening 121 for receiving the core 101, wherein the core 101, in the second position thereof, can only be inserted into the receiving opening 121 of the tool part 120 when the tool part 120 is in the second position thereof.

LIST OF REFERENCE SIGNS

10 Extruded part/Battery housing shell
11 First wall (of the extruded part)
12 Second wall (of the extruded part)
13 Third wall (of the extruded part)
14, 15 Through-hole
22, 23 Material inner edge (of the extruded part)
40 Binding seam (of the extruded part)
50 Through-opening (of the extruded part)

60 Connection region (of the extruded part)
70 Fiber grid (of the extruded part)
80 Polymer melt
81, 82, 83 Melt front (of the polymer melt(s))
90 Flow direction (of the polymer melt(s))
100 Die/mold
101, 102 Core (of the die)
103 Receiving device/recess (of the die)
110 Punch
120 Tool part
121 Receiving opening (of the tool part)
P Pressing direction
R Extension direction of the core

The invention claimed is:

1. An extruded part formed by extrusion of at least one polymer melt that has two melt fronts, wherein said extruded part is a shell for a battery housing of a motor vehicle's traction battery, wherein said extruded part comprises two material inner edges that are formed upon solidification of the polymer melt, wherein the two material inner edges are integrally bonded to each other and define a linear binding seam of the extruded part, wherein the binding seam is situated in a connection region of the extruded part; and wherein the extruded part has at least one fiber grid, which is situated at least in the connection region of the extruded part and is connected to the extruded part such that the fiber grid bridges the two material inner edges.

2. The extruded part according to claim 1, wherein at least 50% of the fibers of the fiber grid have a longitudinal extension which runs transversely to the binding seam and encloses an angle of between 45° and 90° with the binding seam.

3. The extruded part according to claim 1, wherein the at least one fiber grid adjoins an inner surface of the extruded part.

4. The extruded part according to claim 1, wherein the at least one fiber grid adjoins an outer surface of the extruded part.

5. The extruded part according to claim 1, wherein the fiber grid is embedded in a matrix material, the matrix material being integrally bonded to the polymer melt or polymer melts.

6. Battery housing for a traction battery, wherein the battery housing has at least one extruded part according to claim 1.

7. Traction battery for a motor vehicle, wherein the traction battery has a battery housing according to claim 6, wherein at least one battery module is contained in the interior of the battery housing.

8. A method for producing the extruded part of claim 1 by means of an extrusion tool, the method having the following method steps:
placing at least one polymer melt in a die of the extrusion tool that is in the open position;
placing a fiber grid in the extrusion tool;
closing the extrusion tool so that a punch of the extrusion tool comes into contact with the at least one polymer melt and the polymer melt is deformed by applying pressure by means of the punch and the fiber grid is surrounded on two sides by two melt fronts of the at least one polymer melt and is bonded to the polymer melt.

9. The method according to claim 8, wherein the fiber grid is placed in the extrusion tool such that the fiber grid is situated in the immediate vicinity of a core of the die, so that the core is situated between the polymer melt and the fiber grid.

10. The method according to claim 8, characterized by the following features:
placing two polymer melts in the die of the extrusion tool that is in the open position;
placing the fiber grid between the two polymer melts;
closing the extrusion tool so that the punch of the extrusion tool comes into contact with the two polymer melts and the polymer melts are deformed by applying pressure by means of the punch and the fiber grid is surrounded by a first melt front of the first polymer melt and by a second melt front of the second polymer melt and is bonded to the polymer melts.

11. An extrusion tool for producing the extruded part of claim 1 for a traction battery, wherein the extrusion tool has a die and a punch, wherein the die has a receiving device for receiving a fiber grid, the extrusion die being characterized by the following features:
the extrusion tool has a tool part which can be adjusted along a pressing direction (P) of the punch between a first position and a second position;
the extrusion tool has at least one core which can be adjusted between a first position and a second position along an extension direction (R) running transversely to the pressing direction (P);
the tool part has at least one receiving opening for receiving the core, the core being insertable into the receiving opening of the tool part in its second position only when the tool part is in its second position.

12. The extrusion tool according to claim 11, wherein the receiving device is designed as a recess in the die.

* * * * *